(12) United States Patent
Miura et al.

(10) Patent No.: US 9,001,042 B2
(45) Date of Patent: Apr. 7, 2015

(54) POINTING DEVICE AND WIRELESS TERMINAL FOR REDUCING POWER CONSUMPTION BY SUPPLYING POWER ONLY WHEN A CONTACT IS DETECTED

(75) Inventors: Takanori Miura, Yokohama (JP); Yoshiharu Orimoto, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 1003 days.

(21) Appl. No.: 13/060,892

(22) PCT Filed: Aug. 21, 2009

(86) PCT No.: PCT/JP2009/064651
§ 371 (c)(1),
(2), (4) Date: Feb. 25, 2011

(87) PCT Pub. No.: WO2010/024200
PCT Pub. Date: Mar. 4, 2010

(65) Prior Publication Data
US 2011/0157019 A1 Jun. 30, 2011

(30) Foreign Application Priority Data

Aug. 26, 2008 (JP) ................................. 2008-216741
Oct. 29, 2008 (JP) ................................. 2008-277883

(51) Int. Cl.
*G06F 3/033* (2013.01)
*G06F 3/041* (2006.01)
(Continued)

(52) U.S. Cl.
CPC ............ *G06F 1/3203* (2013.01); *G06F 1/1626* (2013.01); *G06F 1/1684* (2013.01); *G06F 1/169* (2013.01); *G06F 1/3231* (2013.01); *G06F 1/3259* (2013.01); *G06F 3/03543* (2013.01); *G06F 3/038* (2013.01); *G06F 2203/0384* (2013.01); *Y02B 60/1253* (2013.01); *Y02B 60/1289* (2013.01)

(58) Field of Classification Search
CPC ....................................................... G06F 3/033
See application file for complete search history.

(56) References Cited

U.S. PATENT DOCUMENTS 5,907,130 A * 5/1999 Suzuki ........................ 178/19.01
6,456,856 B1 * 9/2002 Werling et al. ............ 455/575.5
(Continued)

FOREIGN PATENT DOCUMENTS

| JP | 09-054648 | 2/1997 |
| JP | 10-065764 | 3/1998 |

(Continued)

*Primary Examiner* — Joseph Feild
*Assistant Examiner* — K. Kiyabu

(57) ABSTRACT

A pointing device includes a displacement detection section that detects an amount of displacement and a direction of displacement of the self-pointing device; a wireless communication section that transmits information of the amount of displacement and the direction of displacement which are detected by the displacement detection section as a radio signal; one or a plurality of contact detection sections that detect the presence or the absence of a contact; and a power source control section that, while at least one of the contact detection sections detects any contact, supplies electric power to the wireless communication section and the displacement detection section, and that, while none of the contact detection sections detects any contact, does not supply electric power to the wireless communication section and the displacement detection section.

9 Claims, 14 Drawing Sheets

(51) Int. Cl.
*G06F 3/038* (2013.01)
*G06F 1/32* (2006.01)
*G06F 1/16* (2006.01)
*G06F 3/0354* (2013.01)

(56) References Cited

U.S. PATENT DOCUMENTS

2002/0063477 A1  5/2002  Chang et al.
2009/0143106 A1* 6/2009  Meitzler et al. ............... 455/566

FOREIGN PATENT DOCUMENTS

| JP | 10-124250 | 5/1998 | |
| JP | 10124250 A * | 5/1998 | ............ G06F 3/033 |
| JP | 2000330946 | 11/2000 | |
| JP | 2000330946 A * | 11/2000 | ............ G06F 15/02 |
| JP | 2001274612 | 10/2001 | |
| JP | 2001274612 A * | 10/2001 | ............ H01Q 1/24 |
| JP | 2004-118416 | 4/2004 | |
| JP | 2004118416 A * | 4/2004 | ............ G06F 3/02 |
| JP | 2004-147272 | 5/2004 | |
| JP | 2005-267645 | 9/2005 | |
| JP | 2005354243 | 12/2005 | |

* cited by examiner

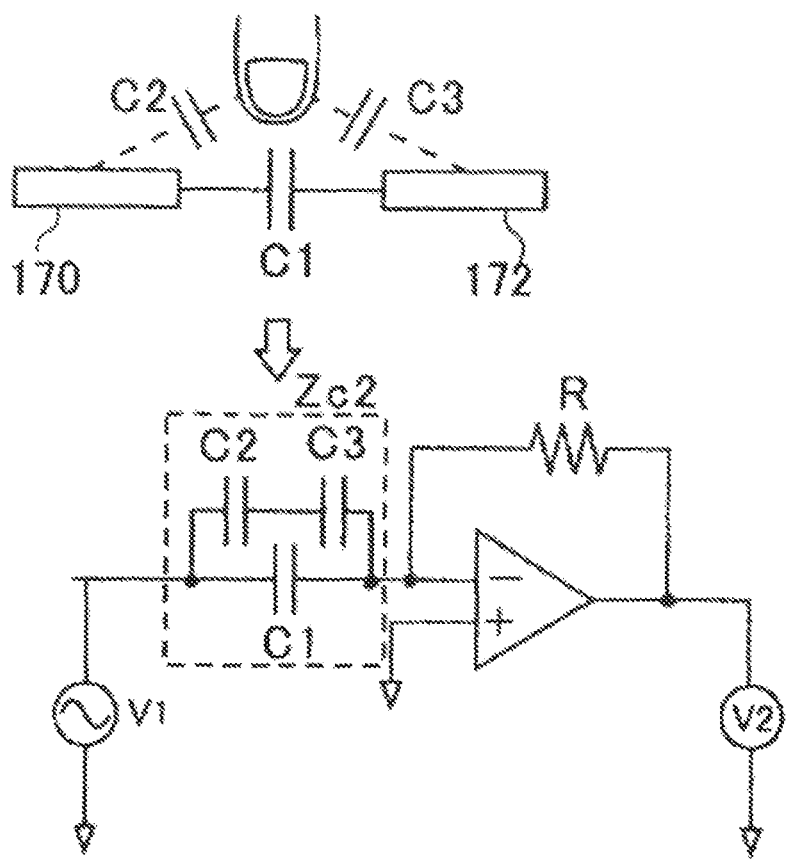

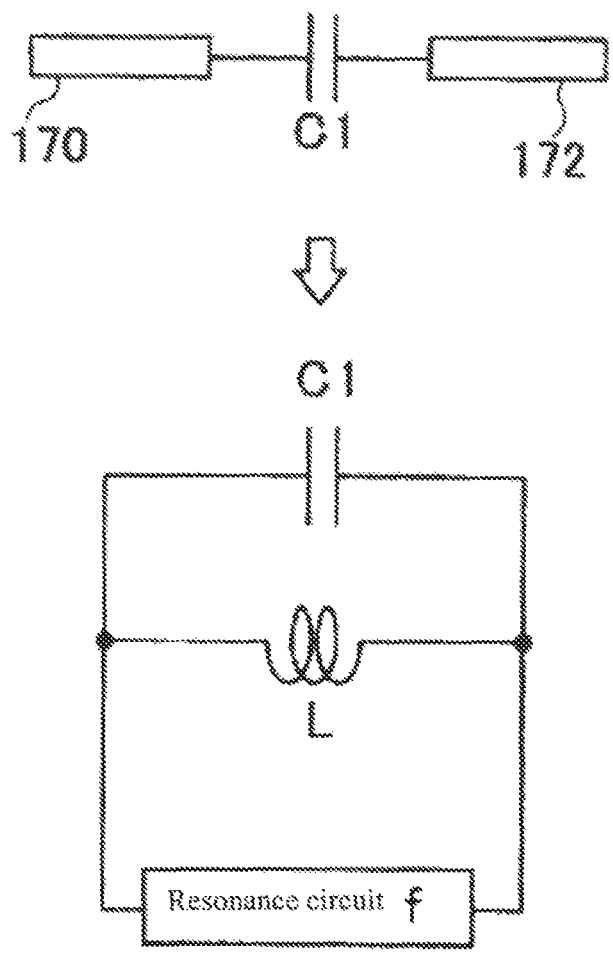

Fig. 7

| Contact detection section which contacts (numeral) | Details of the operation command |
|---|---|
| Displace over the mounted image while contacting 312A, 312B (basic posture) | Cursor movement |
| Slide and contact over 312C, 312D while contacting 312A, 312B (basic posture) | Scroll |
| Separate the section that contacts 312A (contact only 312B) | Left-click |
| Separate the section that contacts 312B (contact only 312A) | Right-click |
| Displace over the mounted image while separating the section that contacts 312A (contact only 312B) | Left-drag |
| Displace over the mounted image while separating the section that contacts 312B (contact only 312A) | Right-drag |
| From the left-drag (contact only 312B) to the basic posture (contact 312A, 312B) | Left-drop |
| From the right-drag (contact only 312A) to the basic posture (contact 312A, 312B) | Right-drop |

POINTING DEVICE AND WIRELESS TERMINAL FOR REDUCING POWER CONSUMPTION BY SUPPLYING POWER ONLY WHEN A CONTACT IS DETECTED

TECHNICAL FIELD

The present invention relates to a pointing device and a wireless terminal that are connected to, for example, a personal computer, etc., via wireless signals.

BACKGROUND ART

In recent years, the mouse has been widely used as a pointing device for a personal computer, etc. Additionally, because the cord which connects the mouse and the personal computer stands in the way while operating and carrying the mouse, the wireless mouse, in which the mouse is turned into a cordless device using wireless signals, has become popular. In general, the wireless mouse is connected to the personal computer, etc., through infrared rays and electromagnetic waves.

Although the mouse always has to be turned on to accept the input from a user, the abovementioned wireless mouse cannot receive an electric power supply; therefore, operation electric power in itself has to be secured using a battery, etc. In order to suppress electric power consumption, a technology that intentionally switches to a power save mode by pressing an operation interface for a predefined period of time has been published (see Japanese Published Unexamined Application No. 2005-267645).

Additionally, as for the movement of the mouse, the accuracy of a ball-type mouse easily decreases because of stains on the mounting surface; however, recently, the optical-type (optical) mouse, which is stain-resistant and which is easy to clean, has become mainstream. Such an optical mouse detects the displacement between the mouse and the mounting surface of the mouse by observing a reflected wave, such as an infrared ray, regardless of whether it is wireless or wired operation.

As described above, the wireless mouse consumes more electric power than a wired mouse due to transmission a communication signal (infrared rays and electromagnetic waves) to a personal computer. Additionally, the abovementioned optical mouse also consumes electric power further because it utilizes infrared rays. However, because the wireless mouse has no electric power supply paths such as the connecting wire that is provided in the wired mouse, generally, a power source such as a battery is installed inside; however, because it needs to be housed in the housing of the wireless mouse, there is no choice, but to use a small-sized battery comprising a small power storage capacity. As a result, the user is forced to perform burdensome operations such as replacement of a battery and is required to frequently purchase and replace the battery when, in particular, the optical wireless mouse is used. Therefore, further power saving of the optical wireless mouse has been expected.

However, in the wireless mouse according to the Japanese Published Unexamined Application No. 2005-267645, the user has to intentionally press the operation interface such as a switch in order to switch the wireless mouse to the power save mode. Therefore, even if the user possesses a mouse in which such technology is employed, the user will not make an effort to try to suppress the electric power consumption by going through complicated operations; thus, it is expected that such technology is not utilized effectively.

PRIOR ART DOCUMENT

Patent Document

Patent Document 1: Japanese Published Unexamined Application No. 2005-267645

SUMMARY OF THE INVENTION

In order to solve the abovementioned problems, one of the embodiments of the pointing device of the present invention comprises a displacement detection section, a wireless communication section, one or a plurality of contact detection sections, and a power source control section. The displacement detection section detects an amount of displacement and a direction of displacement of the self-pointing device. The wireless communication section transmits information of the amount of displacement and the direction of displacement which are detected by the displacement detection section as a wireless signal. The contact detection section detects the presence or the absence of a contact. The power source control section, while at least one of the contact detection sections detects any contact, supplies electric power to the wireless communication section and the displacement detection section, and when none of the contact detection sections detects any contact, does not supply electric power to the wireless communication section and the displacement detection section. Additionally, one of the embodiments of the wireless terminal of the present invention comprises a base station communication section, a plurality of contact detection sections, a displacement detection section, a terminal control section, a wireless communication section, and a power source control section. The base station communication section performs wireless communication with a base station. The contact detection section detects the presence or the absence of a contact. The displacement detection section detects an amount of displacement and a direction of displacement of the self-wireless terminal. The terminal control section creates an operation command in accordance with a combination of the contact detection sections that are contacted simultaneously. The wireless communication section transmits information of the operation command that is created by the terminal control section or information of the amount of displacement and the direction of displacement which are detected by the displacement detection section as a wireless signal. The power source control section, while at least one of the contact detection sections detects any contact, supplies electric power to the wireless communication section and the displacement detection section, and while none of them detects any contact, does not supply electric power to the wireless communication section and the displacement detection section.

According to the abovementioned pointing device and wireless terminal, in the pointing device and the wireless terminal which are connected to, for example, a personal computer via a wireless signal, the electric power consumption can be reduced as much as possible.

BRIEF DESCRIPTION OF DRAWINGS

FIG. 3B is an explanatory diagram of the principle in which the contact detection section detects the presence or the absence of a contact (in the case of measuring a voltage when a finger is approaching).

FIG. 3C 1 is an explanatory diagram of the principle in which the contact detection section detects the presence or the absence of a contact (in the case of measuring a resonance frequency when a finger is not approaching).

FIG. 7 is a table that associates an operation command with the contact detection section that is contacted.

EXPLANATION OF REFERENCES

100—Mouse (Pointing device)
104—Switch
106—Displacement detection section
108—Scroll detection section
110—Wireless communication section
112—Contact detection section
114—Power source control section
300—Mobile phone (wireless terminal)
326—Base station communication section
328—Function restriction section

EMBODIMENTS FOR CARRYING OUT THE INVENTION

Preferred embodiments of the present invention are explained in detail below with reference to the appended drawings. Dimensions, materials, and other specific values shown in such embodiments are for illustrative purposes only and are not intended to limit the present invention unless specifically stated otherwise. However, in the present specification and drawings, elements having substantially the same functions and constitution are provided with the same numerals so as to omit redundant description, and illustration of elements that are not directly related to the present invention is omitted.

Because, in general, pointing devices such as a wireless mouse cannot receive a power supply, some of them may hold a power source such as a battery. However, the wireless mouse consumes more electric power than a wired mouse because it utilizes a wireless signal. Additionally, in recent years, optical mouse that does not require the cleaning has become popular and the electric power consumption by the lighting has become even greater; hence, a user is forced to frequently replace the battery. Therefore, further reduction of electric power that is consumed in the wireless mouse more than ever has been expected.

Below, the constitution of the pointing device and the method for electric power control in the input using the pointing device are described, and subsequently, the constitution of the wireless terminal that functions as the pointing device and the method for electric power control in the input using the wireless terminal are described.

(First Embodiment: Pointing Device)

In the first embodiment, a mouse is selected to be described as a pointing device.

Figure 1:
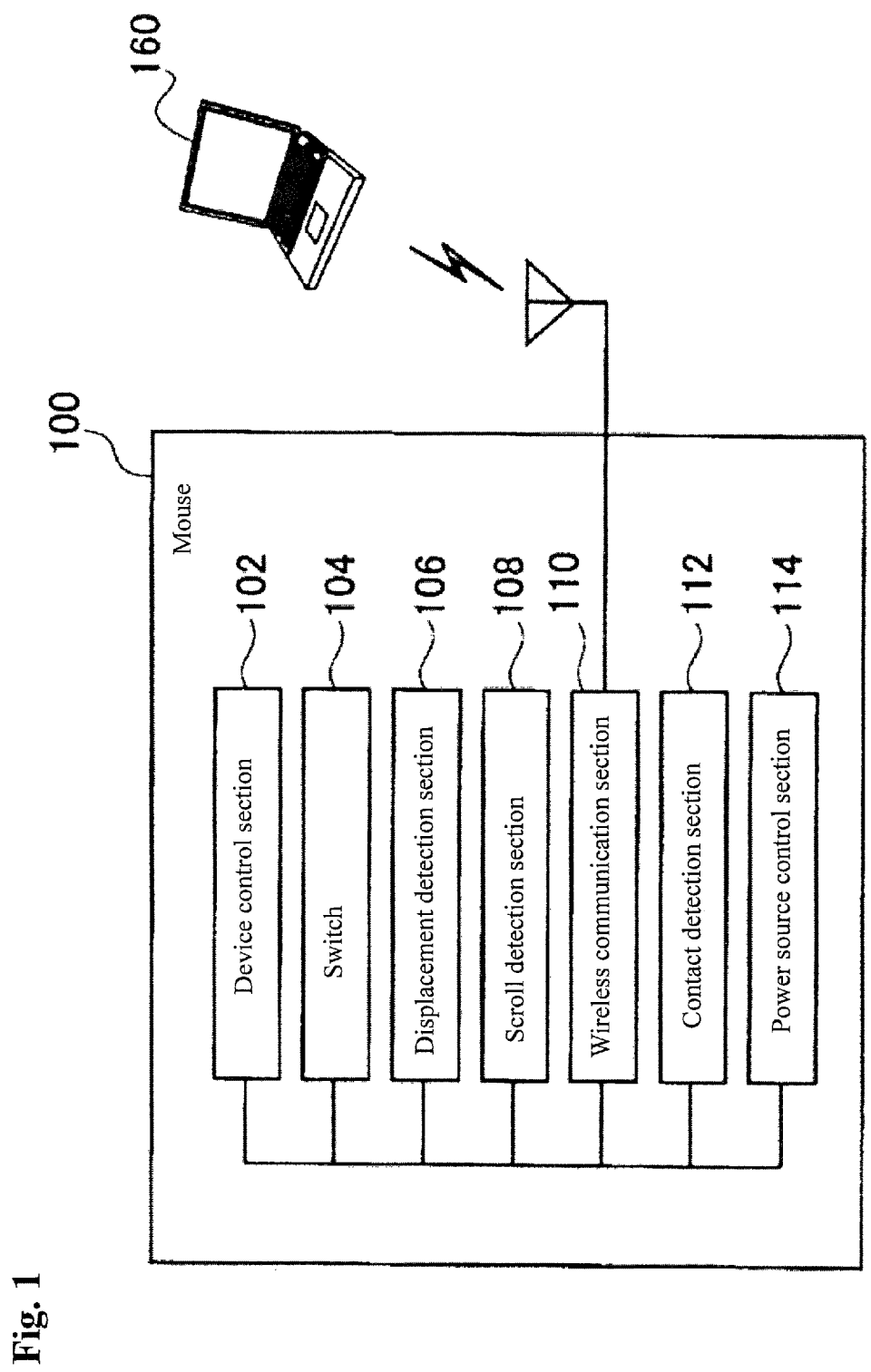
FIG. 1 is a block diagram showing components of the mouse according to the first embodiment of the present invention.
Figure 2:
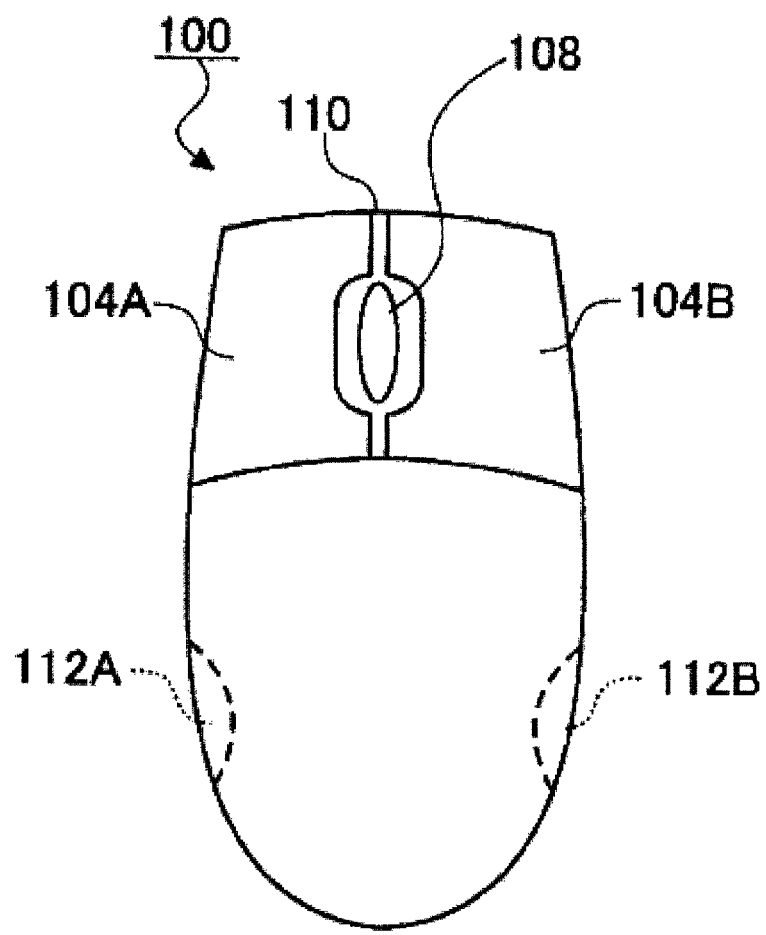
FIG. 2 is a plan view showing one example of the mouse according to the first embodiment of the present invention.

FIG. 1 is a block diagram showing components of a mouse 100 according to the first embodiment, and FIG. 2 is a plan view showing one example of the mouse 100 according to the first embodiment. The mouse 100 comprises a device control section 102, a plurality of switches 104 (104A, 104B), a displacement detection section 106, a scroll detection section 108, a wireless communication section 110 that is connected to a nondirectional antenna, a plurality of contact detection sections 112 (112A, 112B), and a power source control section 114.

The device control section 102 is a semiconductor, such as a CPU, which performs the control of the entire mouse 100. Additionally, information regarding the presence or the absence of a click that is detected by the switch 104, which is described subsequently, the amount of displacement and the direction of displacement that are detected by the displacement detection section 106, and the amount of scroll and the direction of scroll that are detected by the scroll detection section 108, etc., is output to the wireless communication section 110, which is described subsequently. The switch 104 transmits the presence or the absence of a click to the device control section 102 in accordance with whether or not the user has pressed it. The device control section 102 outputs information of the presence or the absence of a click to the wireless communication section 110, and the wireless communication section 110 transmits the information of the presence or the absence of a click to a main device 160 as a wireless signal. The transmitted information of the presence or the absence of a click is used in a click operation corresponding to icons, etc., that are displayed on a monitor of the main device 160. Additionally, as the switch 104 that is placed on the mouse 100, there are generally a switch 104A (left button) that represents a left-click and a switch 104B (right button) that represents a right-click depending on what is pressed by the user.

The displacement detection section 106 detects an amount of displacement and a direction of displacement when a user causes the mouse 100 to slide so as to be displaced on the mounting surface of the mouse 100. The device control section 102 outputs information of the amount of displacement and information of the direction of displacement to the wireless communication section 110. The wireless communication section 110 transmits the information of the amount of displacement and the information of the direction of displacement to the main device 160 as a wireless signal. The information of the amount of displacement and the information of the direction of displacement are used for the movement of the position of a cursor that is displayed on a monitor of the main device 160. The mouse 100 according to the first embodiment is an optical mouse in which the displacement detection section 106 emits a light from a luminous body such as an LED and that detects an amount of displacement and a direction of displacement of the mouse from a change of the reflected light. However, the detection of the amount of displacement and the direction of displacement that are used for the movement of the cursor is not limited to the optical type, such as that of the first embodiment; instead, a touch panel, an acceleration sensor, etc., may be used.

The scroll detection section 108 comprises a wheel, etc., which detects an amount of scroll and a direction of scroll from the amount of rotation and the direction of rotation when the user rotates the wheel back and forth. The device control section 102 outputs information of the amount of scroll and information of the direction of scroll to the wireless communication section 110, and the wireless communication section 110 transmits the information of the amount of scroll and the information of the direction of scroll to the main device 160 as a wireless signal. The information of the amount of scroll and the information of the scroll direction are used in the scroll operation of the screen that is displayed on the main device 160.

The wireless communication section 110 utilizes infrared rays and electromagnetic waves (Bluetooth, ZigBee, or NFC (Near Field Communication)) so as to transmit a wireless signal that includes the presence or the absence of a click, an amount of displacement, a direction of displacement, an amount of scroll, a direction of scroll, etc., to the main device 160 such as a personal computer.

The contact detection sections 112 detect the presence or absence of a contact of a hand or a finger. The detection of the contact detection sections 112 are transmitted to the device control section 102 and the power source control section 114 which is described subsequently.

Figure 3A:
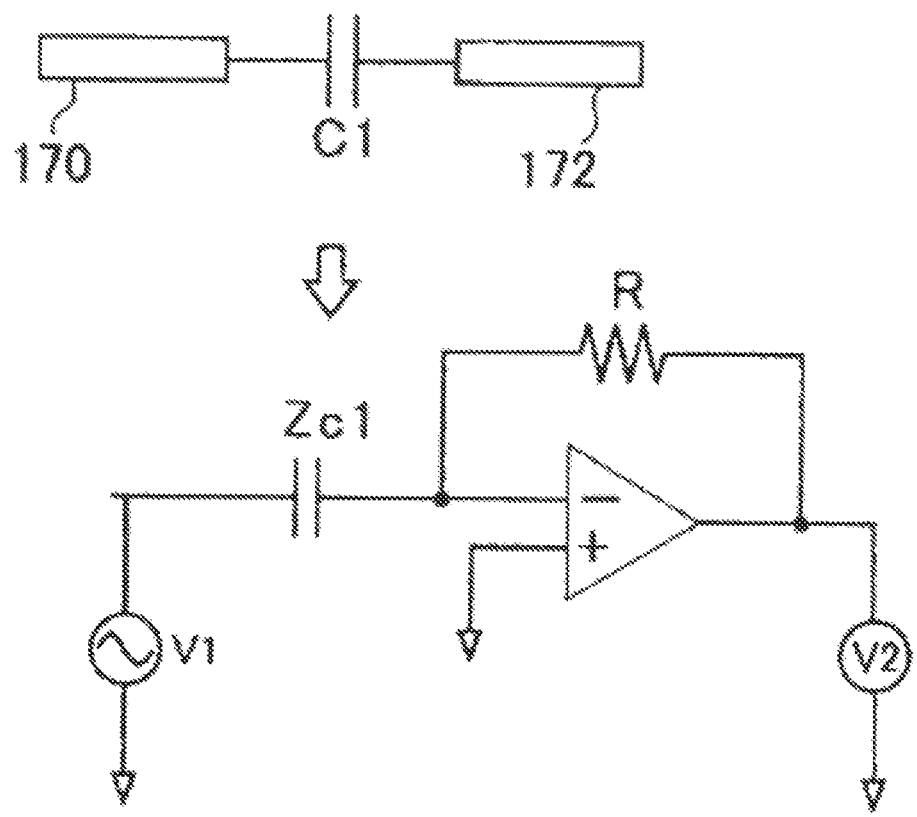
FIG. 3A is an explanatory diagram of the principle in which the contact detection section detects the presence or the absence of a contact (in the case of measuring a voltage when a finger is not approaching).
Figure 3D:
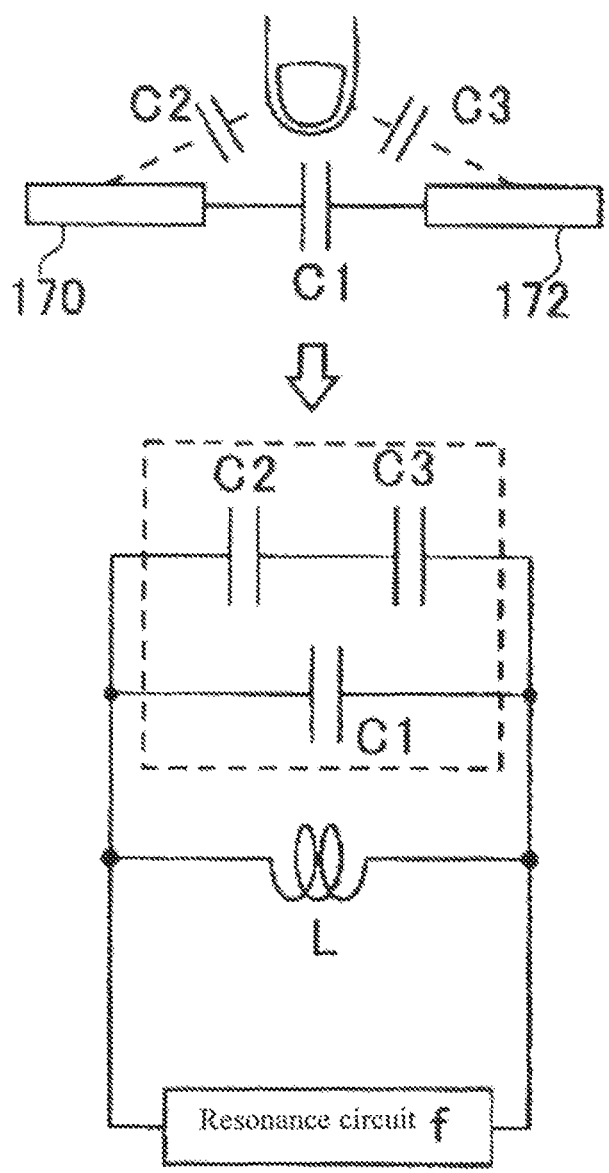
FIG. 3D is an explanatory diagram of the principle in which the contact detection section detects the presence or the absence of a contact (in the case of measuring a resonance frequency when a finger is approaching).

FIG. 3 is an explanatory diagram of the principle in which the contact detection sections 112 detect the presence or the absence of a contact. In particular, FIG. 3A, FIG. 3B show the detection through a measured voltage, and FIG. 3C, FIG. 3D show the detection through the measured frequency. As shown in FIG. 3A, the contact detection sections 112 comprise two electrodes, namely 170, 172, and a measured voltage V2 is ascertained by the ratio of an impedance $Zc1$ by a fixed electrostatic capacity C1 between the two electrodes, namely 170, 172 to a resistance R (V2 V1×(R/Zc1)). As shown in FIG. 3B, when a finger of a user approaches the two electrodes, namely 170, 172, electrostatic capacities C2, C3 are added to the electrostatic capacity C1, and the impedance $Zc1$ is changed to an impedance $Zc2$. The measured voltage V2 is thereby changed in conjunction with the change in the ratio of the impedance $Zc2$ to the resistance R (V2=−V1×(R/Zc2)). The contact detection sections 112 detect the presence or the absence of a contact of a human body, a hand, and a finger by such changes in the measured voltage V2.

Additionally, there is another example of the contact detection sections 112 that utilize a LC parallel resonant circuit such as shown in FIG. 3C. Again, in the figure, two electrodes, namely 170, 172 are placed, and a resonance frequency f is ascertained based on the fixed electrostatic capacity C1 between the two electrodes, namely 170, 172 and a inductor L that is connected thereto in parallel ($f=1/(2\pi\sqrt{LC})$). When, as shown in FIG. 3D, a finger of a user approaches the two electrodes, namely 170, 172, the electrostatic capacity C1 is changed, and along with that, the resonance frequency f is also changed. The contact detection sections 112 can detect the presence or the absence of a contact of a human body, a hand, and a finger even by such changes in the resonance frequency f.

Additionally, as shown in FIG. 1, the contact detection sections 112 comprise a contact detection section 112A that is placed on the left side of the rear section of the mouse 100 and a contact detection section 112B that is placed on the right side of the rear section of the same. When the user operates the mouse 100, a right-handed user typically operates it with the right hand; hence, the little finger contacts the contact detection section 112B. On the other hand, when a left-handed user operates it with the left hand, generally, a thumb contacts an upper section (upper side shown in FIG. 1) of the mouse compared to that of the little finger; hence, no finger contacts the contact detection section 112B. Accordingly, when the contact detection section 112B detects a contact, it can be determined that the user operates with the right hand.

Similarly, because the left-handed user operates with the left hand, the little finger contacts the contact detection section 112A. When the right-handed user operates with the right hand, no finger contacts the contact detection section 112A. Accordingly, when the contact detection section 112A detects a contact, it can be determined that the user operates with the left hand. Therefore, the device control section 102 can determine which of the contact detection section 112A or the contact detection section 112B is contacted, allowing the device control section 102 to identify whether the hand of a user that grips the mouse 100 is the left hand or the right hand.

The correspondence relationship between a click of the respective switches 104 and the respective operation command signals that are output in response to a click by the respective switches 104 is previously set as a property of the mouse 100, for right hand use or left hand use. With regard to the property settings for right hand use, a click of the switch 104A corresponds to an operation command signal A and a click of the switch 104B corresponds to an operation command signal B, and on the other hand, with regard to the property settings for left hand use, a click of the switch 104A corresponds to an operation command signal B and a click of the switch 104B corresponds to an operation command signal A. In this way, the operation commands are exchanged according to the setting for right hand use and the setting for left hand use.

As described above, there are a plurality of contact detection sections 112 and switches 104, and while at least one of the contact detection sections 112 is placed at a position at which whether the hand of the user that grips the mouse 100 is the left hand or the right hand can be identified, for example, on a side surface, an upper surface, and/or a rear surface, and while it is identified as being gripped by the left hand, the contact detection sections 112 transmit to the device control section 102 that the hand of the user that grips the mouse 100 is the left hand and the device control section 102 is property-set to left hand use, such that the operation command signal A is transmitted when the switch 104B is clicked. On the other hand, the device control section 102 is property-set to right hand use when it is identified as being gripped with the right hand.

Based on such a constitution, the user is allowed to utilize the mouse 100 freely, without performing complicated settings for his or her dominant hand in the mouse 100. Additionally, it is not necessary to perform complicated switching operations even when users with different dominant hands alternately utilize the mouse 100.

The power source control section 114 comprises a battery and a circuit that restricts electric power from the battery, etc., and supplies electric power to operate the entire mouse 100. Additionally, the power source control section 114 supplies electric power to the wireless communication section 110 and the displacement detection section 106 while at least one of the contact detection sections 112 detects a contact, and does not supply electric power while none of them detects any contact.

Generally, when a user uses the mouse 100, there is a section that is always in contact, in order to grip the mouse 100. In the first embodiment, the contact detection sections 112 are arranged on such a contact section such that the mouse 100 can detect that the user is trying to utilize the mouse 100. Additionally, because it can be considered that the mouse 100 is not used while the user does not contact the contact detection sections 112, the electric power for detecting the amount of displacement and the direction of displacement as well as the electric power for transmitting the detected wireless signals do not become necessary. The power source control section 114 stops this electric power supply, allowing to securely reduce electric power consumption of the mouse 100 without deteriorating the operability for the user.

Additionally, the power source control section 114 does not supply electric power to the displacement detection section 106 while the scroll detection section 108 detects an amount of scroll and a direction of scroll. Generally, the user does not move the cursor during the scroll operation. By utilizing such an operation, while the amount of scroll and the direction of scroll are detected, the power source control section 114 stops supplying electric power to the displacement detection section 106, allowing reduction of electric power consumption of the mouse 100.

Furthermore, the power source control section 114 does not supply electric power to the displacement detection section 106 while the switch 104 is operated. Generally, the user does not move the cursor during the very short time of operating the switch 104 to click. By utilizing such an operation, electric power supply to the displacement detection section 106 is stopped while the operation of the switch 104 is detected, allowing the reduction of electric power consumption.

For a similar reason, the user also does not move the cursor while performing a drop operation (terminating a click) after a drag operation; hence, electric power supply to the displacement detection section 106 is stopped, allowing reduction of electric power consumption.

However, as for the drag operation, when electric power supply is stopped at the starting point of the drag, the displacement detection section 106 cannot function in subsequent sliding. Therefore, in order to detect the drag operation normally, the power source control section 114 resumes electric power supply to the displacement detection section 106 after a predetermined time period (very short time period) elapses while the switch 104 is pressed.

(Method for Electric Power Control)

Figure 4:
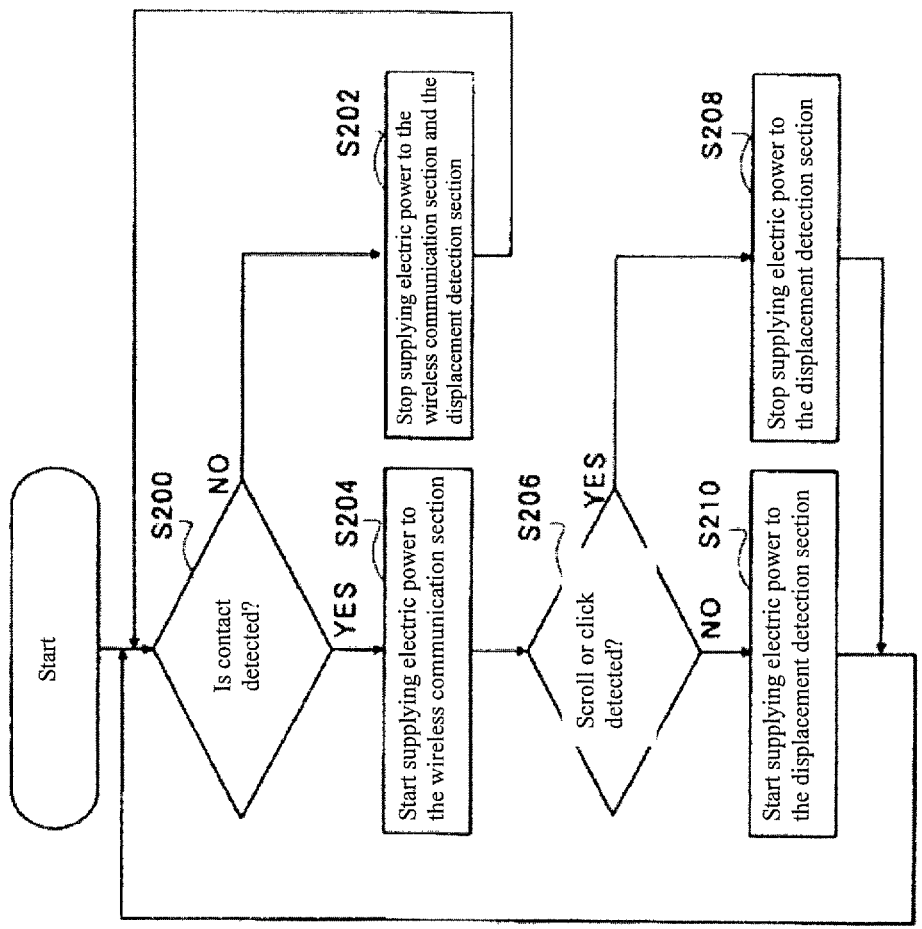
FIG. 4 is a flowchart describing the process flow of the electric power control method according to the first embodiment of the present invention.

FIG. 4 is a flowchart describing the process flow of the method for electric power control according to the first embodiment of the present invention.

Under the state of utilizing the mouse 100, it is determined whether or not the contact detection sections 112 of the mouse 100 detect the contact of the user (S200), if electric power is supplied to the wireless communication section 110 and the displacement detection section 106 while any contact is not detected (S200: NO), the electric power supply to them is stopped (S202), and if the electric power supply has already been stopped, the stopped state is maintained. Here, this step is repeated until the contact of the user is detected.

Once the contact detection sections 112 detect a contact (S200: YES), if electric power is not supplied to the wireless communication section 110, the power supply is commenced (S204). Subsequently, it is determined whether or not the scroll detection section 108 detects an amount of scroll and a direction of scroll, or it is determined whether or not a click for the switch 104 is detected (S206), and when any of the amount of scroll, the direction of scroll, or a click is detected (S206: YES), if electric power is supplied to the displacement detection section 106, the electric power supply is stopped while any of the amount of scroll, the direction of scroll, or a click is detected (S208), and the flow returns to the determination of detecting a contact (S200). However, in order to detect the drag operation normally, the power source control section 114 ignores the detected click after a predetermined time period (very short time period) elapses while pressing the switch 104. When none of the amount of scroll, the direction of scroll, or the click is detected or when the power source control section 114 ignores the detection (S206: NO), electric power is supplied to the displacement detection section 106 (S210), and the flow returns to the determination of detecting a contact (S200).

Although, in the abovementioned first embodiment, the optical wireless (radio) mouse 100 is selected as an example as a pointing device, it is not limited thereto, and a ball-type mouse, a laser mouse, a track ball, etc., may be used for the mouse 100.

(Second Embodiment: Mobile Phone)

In the first embodiment, the mouse 100 as the pointing device was selected as an example. In the second embodiment, a mobile phone 300 is selected as an example of a wireless terminal that is provided with functions similar to the mouse 100 according to the first embodiment to describe the effects.

Figure 5:
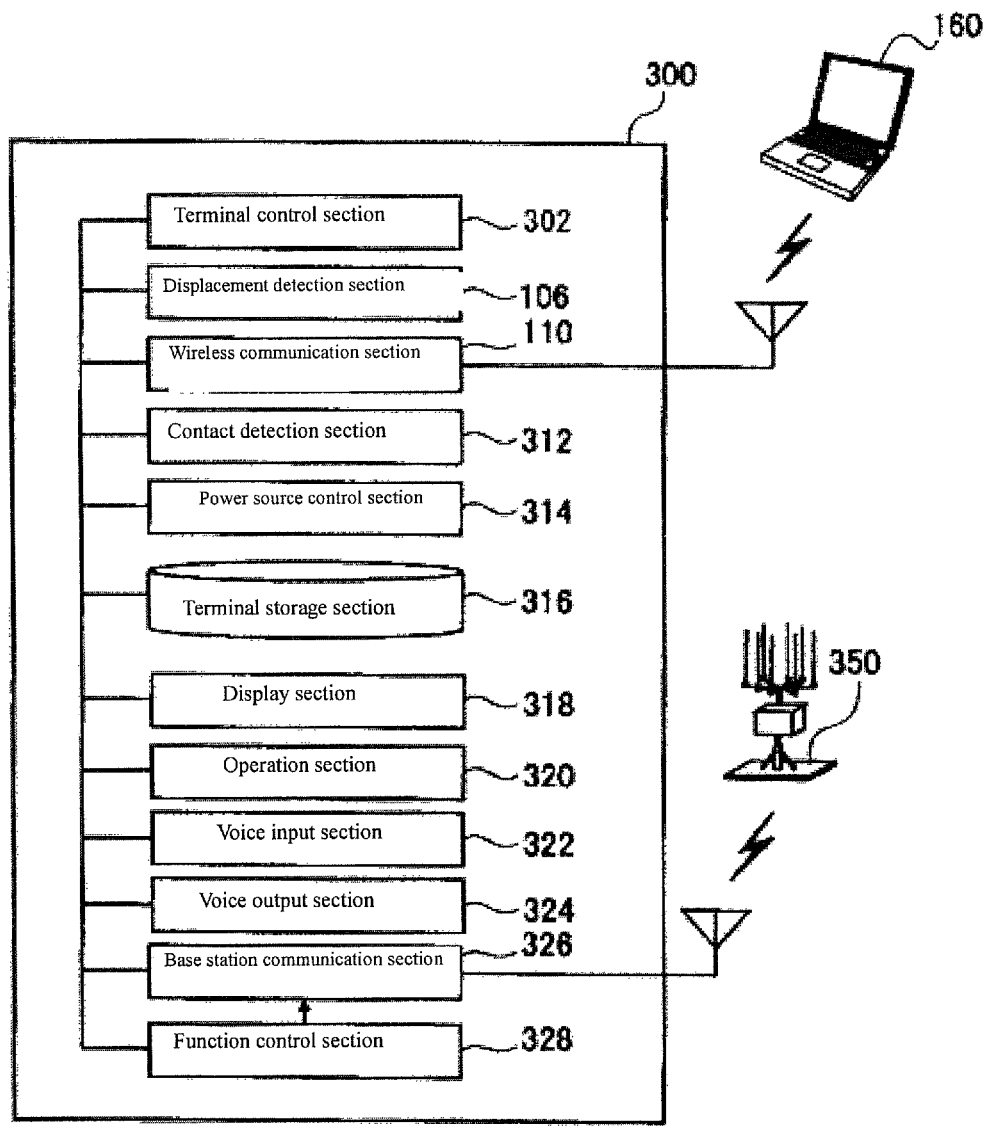
FIG. 5 is a block diagram showing components of the mobile phone according to the second embodiment of the present invention.
Figure 6A:
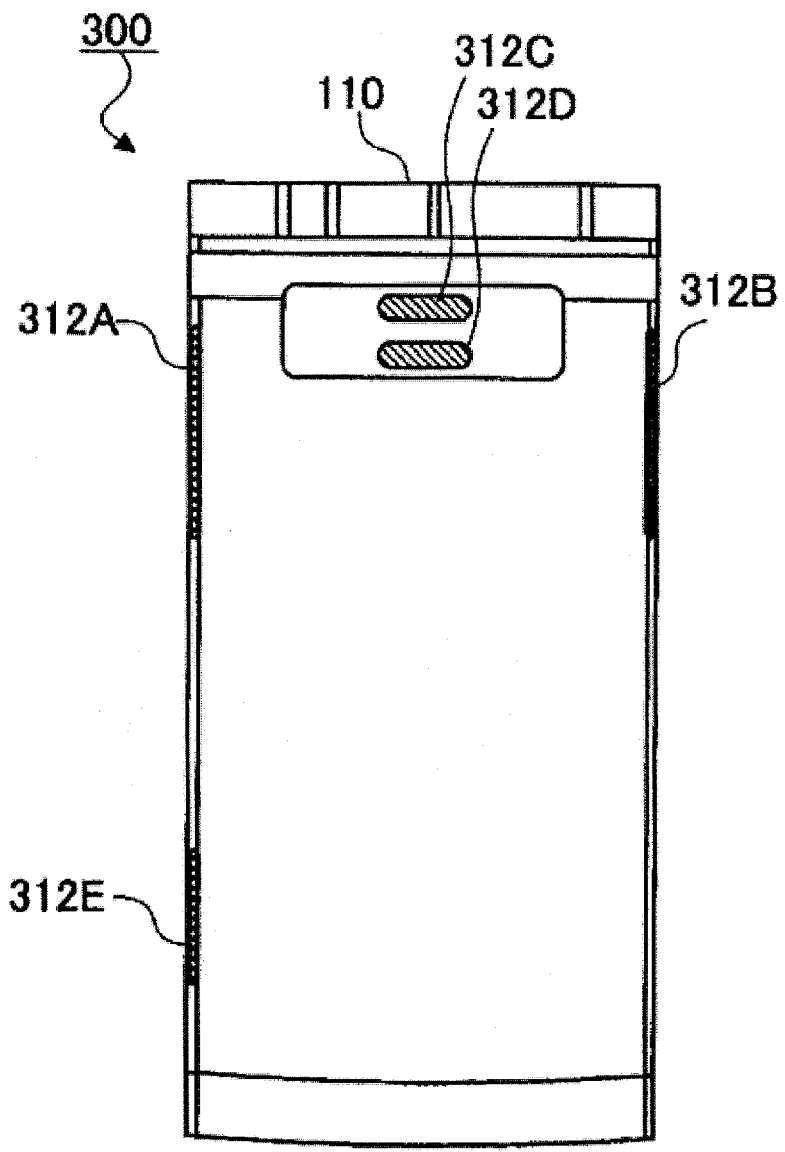
FIG. 6A is a front view showing one example of the mobile phone according to the second embodiment of the present invention.
Figure 6B:
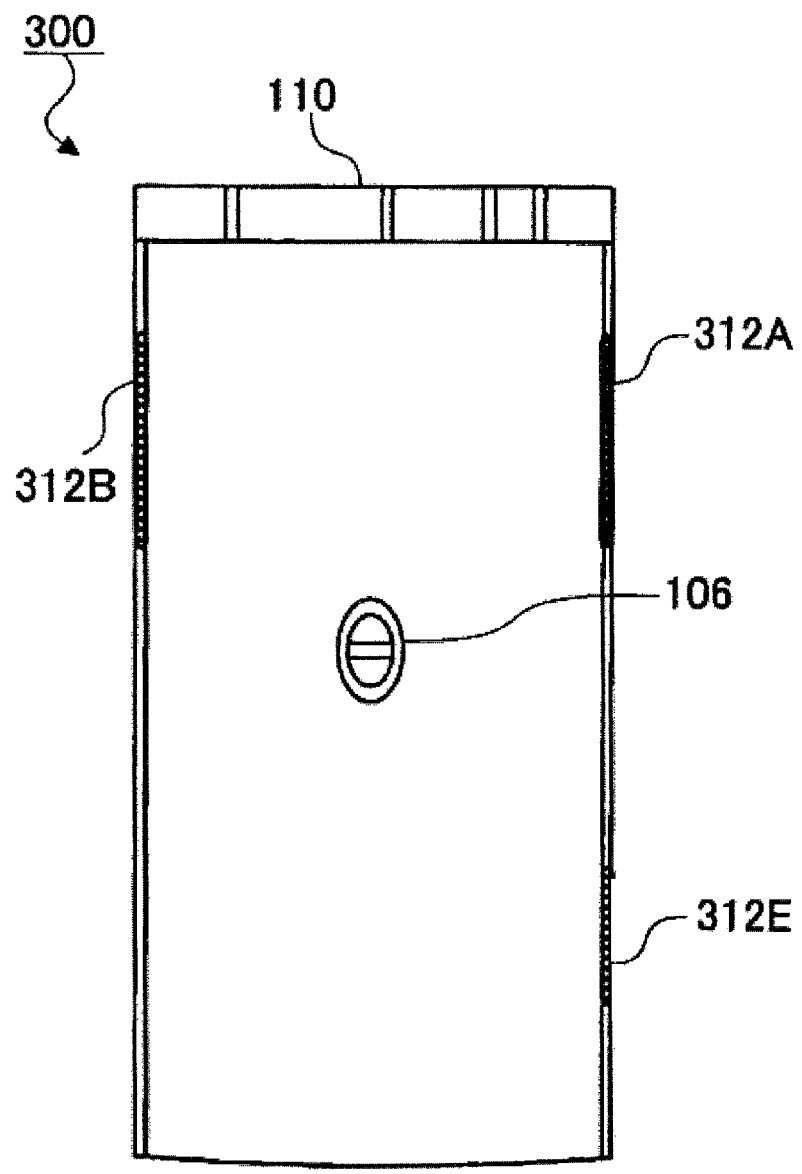
FIG. 6B is a rear view showing one example of the mobile phone according to the second embodiment of the present invention.

FIG. 5 is a block diagram showing components of the mobile phone 300 according to the second embodiment, and FIG. 6 is a plane view showing one example of the mobile phone 300 according to the second embodiment. Additionally, FIG. 6A is a frontal view of the mobile phone 300, while FIG. 6B is a rear view of the mobile phone 300. The mobile phone 300 comprises a terminal control section 302, the displacement detection section 106, the wireless communication section 110, a plurality of contact detection sections 312 (312A, 312B, 312C, 312D, 312E), a power source control section 314, a terminal storage section 316, a display section 318, an operation section 320, a voice input section 322, a voice output section 324, a base station communication section 326, and a function restriction section 328.

Repeated descriptions of the displacement detection section 106 and the wireless communication section 110 are omitted because they are substantially the same as the components of the first embodiment, and here, the terminal control section 302, the contact detection section 312, the power source control section 314, the terminal storage section 316, the display section 318, the operation section 320, the voice input section 322, the voice output section 324, the base station communication section 326, and the function restriction section 328, having different constitution, shall be primarily described.

The terminal control section 302 is a semiconductor integrated circuit comprising a central processing unit (CPU), and manages and controls the entire mobile phone 300. Additionally, the terminal control section 302 uses a program of the terminal storing section 316 which is described subsequently to execute a call function, an e-mail sending and receiving function, an imaging function, a music playback function, a Web browsing function, and a TV watching and listening function.

Additionally, the terminal control section 302 receives the presence or the absence of contact in the respective contact detection sections 312 which are transmitted from the plurality of contact detection sections 312 which is described subsequently and creates information of an operation command in accordance with the presence or the absence of the contact detection sections 312 that are contacting the contact detection sections 312 simultaneously or in accordance with a combination of the contact detection sections 312 that are contacting simultaneously. Moreover, similarly to the mouse 100 according to the first embodiment, the terminal control section 302 outputs information of an amount of displacement and a direction of displacement at the time of being detected by the displacement detection section 106 and information of the created operation command to the wireless communication section 110. Furthermore, when the operation command is a scroll operation which is described subsequently, the terminal control section 302 outputs information of an amount of scroll and a direction of scroll at the time of being detected to the wireless communication section 110. The combination of contacting sections and the response of the operation command to be replaced shall be described below.

As shown in FIG. 6A, with regard to the contact detection section 312, a contact detection section 312A is placed on the upper part of the left side surface of the mobile phone 300 a contact detection section 312B is placed on the upper part of the right side surface thereof, contact detection sections 312C, 312D are placed on the upper part of the surface thereof, and a contact detection section 312E is placed on the lower part of the left side surface thereof, respectively, and they detect the presence or the absence of a contact of a hand or a finger. The contact detection section 312 notifies the terminal control section 302 of the presence or the absence of a contact for the respective contact detection sections 312A, 312B, 314C, 314D, 314E. Furthermore, when at least one of the contact detection sections 312 detects a contact, it provides notification of the detection to the power source control section 314 in the same way as that of the contact detection sections 112 according to the first embodiment.

FIG. 7 is a table that associates an operation command with the contact detection section 312 that is contacted. The terminal control section 302 creates information of an operation command in accordance with a combination of the contact detection sections 312 that are contacted. Specific operations are described below.

When performing a normal cursor movement, a user slides and displaces the mobile phone 300 on the mounting surface while contacting only the contact detection sections 312A, 312B. The terminal control section 302 determines such an operation to be an operation command of the cursor movement. Here, when the mobile phone 300 is used as a pointing device, it is assumed that the user basically grips, in the state (basic posture) in which only the contact detection sections 312A, 312B are contacted.

When the user contacts the contact detection sections 312A, 312B, 312C, and 314D, the terminal control section 302 determines that the combination to be an operation command of scroll. In particular, as shown in FIG. 6, the contact detection sections 312C and 314D are arranged with a predetermined interval. For example, when the user slides from one side of the contact detection section 312 to the other side of the contact detection section 312 on both detection surface with a finger, the contact detection sections 312C and 314D detect the speed (time interval) of the slide and the direction of the slide, and notify the terminal control section 302 of them. The terminal control section 302 creates information of an amount of scroll and a direction of scroll direction in accordance with the detected speed of the slide and the direction of the slide. When the user releases the finger, etc., from the contact detection section 312A on which the finger contacted, in the state in which the cursor is moved (in the state in which only the contact detection sections 312A, 312B are contacted: basic posture), it reaches the state in which only the contact detection section 312B is contacted; therefore, it is determined to be the operation command of the left-click. Generally, the user often performs a click operation following a cursor movement. The cursor movement is performed by contacting both of the contact detection sections 312A, 312B; however, in this process, when the finger is released from the contact detection 312A (the upper part of the left side surface of the mobile phone 300) on which the finger contacted, it reaches the state in which only the contact detection section 312B is contacted; therefore, the terminal control section 302 determines that combination to be the operation command of the left-click. This operation is relatively similar to a normal mouse operation; therefore, it rarely causes incorrect operations by the user.

Similarly, when the user releases the finger, etc., from the contact detection section 312B on which the finger contacted, in the state in which the cursor movement is performed (in the state in which only the contact detection sections 312A, 312B are contacted: basic posture), it reaches a state in which only the contact detection section 312A is touched; therefore, the terminal control section 302 determines that combination to be the operation command of the right-click. When the user slides and displaces the mobile phone 300 on the mounting surface in the abovementioned state in which only the contact detection section 312B is touched and in which the operation command of the left-click is performed, by releasing a section that contacts the contact detection section 312A, the terminal control section 302 determines it to be the operation command of the left-drag. Similarly, in the case of the operation command of the right-click, by sliding and displacing on the mounting surface, the terminal control section 302 determines it to be the operation command of the right-drag.

Furthermore, when the user restores from the left-drag state in which the user slides and displaces the mobile phone 300 on the mounting surface by contacting only the contact detection section 312B to the basic posture (in the state in which the contact detection sections 312A, 312B are contacted), the terminal control section 302 determines it to be the operation command of the left-drop. Similarly, when the user returns from the right-drag state to the basic posture (in the state in which the contact detection sections 312A, 312B are contacted), the terminal control section 302 determines it to be the operation command of the right-drop.

Additionally, by detecting the presence or the absence of a contact of the contact detection section 312E, the terminal control section 302 can determine whether the hand of a user that grips the mobile phone 300 is the left hand or the right hand. As shown in FIG. 6, the contact detection section 312E is placed on the lower part of the left side surface of the mobile phone 300, which is not usually contacted when a right-handed user uses the mobile phone 300 as a mouse; however, it is contacted by the little finger when a left-handed user uses it. According to such a constitution, similarly to the mouse 100 according to the first embodiment, a user is allowed to utilize the mobile phone 300 freely without performing complicated settings for his or her own dominant hand to the mobile phone 300. Additionally, it is not necessary to perform complicated switching operations even when users having different dominant hand alternately utilize the mobile phone 300.

The power source control section 314 is a battery and a circuit that restricts electric power from the battery, etc., and supplies electric power to operate the entire mobile phone 300. Additionally, similarly to the mouse 100 according to the first embodiment, the power source control section 314 supplies electric power to the wireless communication section 110 and the displacement detection section 106 while at least one of the contact detection sections 312 detects a contact and does not supply electric power while none of them detects any contact.

Additionally, while the contact detection section 312C detects a contact, that is, while an operation corresponding to a scroll operation is detected, the power source control section 314 may not supply electric power to the displacement detection section 106. According to such a constitution, electric power consumption can be reduced, as described in detail for the mouse 100 according to the first embodiment.

Furthermore, the power source control section 314 may also not supply electric power to the displacement detection section 106 while the contact detection section 312 detects an operation corresponding to a click. According to such a constitution, electric power consumption can be reduced, as described for the mouse 100 according to the first embodiment.

The terminal storage section 316 is a ROM, a RAM, an EEPROM, a nonvolatile RAM, a flash memory, or an HDD, etc., and stores a program and voice data that are processed in the terminal control section 302.

The display section 318 is a liquid crystal display, EL (Electro Luminescence), etc., and can display a GUI (Graphical User Interface) of a Web browser and an application.

The operation section 320 is an input mechanism such as a keyboard or a cross key, and accepts operations by a user. The voice input section 322 is a member that inputs a voice, such as microphones. A voice of a user that is input from the voice input section 322 during call is converted into an electrical signal that can be processed in the mobile phone 300.

The voice output section 324 is a member that outputs a voice, such as a speaker. A voice signal of a calling partner that is received by the mobile phone 300 is output as a voice via the voice output section 324. Additionally, the mobile phone 300 can also output an incoming call tone, an operation sound of the operation section 320, or an alarm tone, etc., via the voice output section 324.

The base station communication section 326 performs wireless communication with a base station 350 in accordance with a standard of the wireless communication.

The wireless mouse as a pointing device according to the first embodiment is separated from a personal computer, etc.; hence, it is inconvenient to carry around. It is highly likely that the mobile phone 300 according to the second embodiment is carried by a user and the mobile phone 300 has a pointing device function, enabling to perform a pointing operation easily through the mobile phone 300 without particularly carrying a wireless mouse, etc.

Additionally, the mobile phone 300 according to the second embodiment is utilized by a user as a pointing device, the contact detection section 312 is arranged on a section of the mobile phone 300 that is presumed to be always contacted, and electric power supply is restricted while the contact detection section 312 is not contacted, allowing to securely reduce electric power consumption of the mobile phone 300 and allowing it to reduce an effect on the electric power for performing original functions of the mobile phone 300 as much as possible, while maintaining operability for a user. The function restriction section 328 restricts an incoming call function of the mobile phone 300 while one of the contact detection sections 312 detects a contact. In general, the mobile phone 300 notifies the user of an incoming call by a sound or vibration once there is a communication request to the terminal itself. However, in a meeting, etc., a sound and vibration cause disturbance to the surroundings, and in some cases, it may be considered to be lack of courtesy. Although there is a manner mode, etc., that suppresses the sound and vibration as a countermeasure, the settings of the manner mode depends heavily on the consciousness of people; therefore, it lacks the certainty of having switched to the manner mode.

Because the function restriction section 328 restricts the incoming functions, when the mobile phone 300 functions as a pointing device such as the mouse 100, a user can simply use the mobile phone 300 as a pointing device, for example, in a meeting, etc., and can securely block the sound and vibration caused by an unexpected incoming call without performing a special operation.

Because the process flow of the method for electric power control according to the second embodiment is substantially the same as the processes of the method for electric power control of the mouse 100 according to the first embodiment, such descriptions are omitted here.

(Third Embodiment: Directional Antenna)

In the third embodiment, an example in which a directional antenna is implemented in the mouse 100 according to the first embodiment is described.

Figure 8:
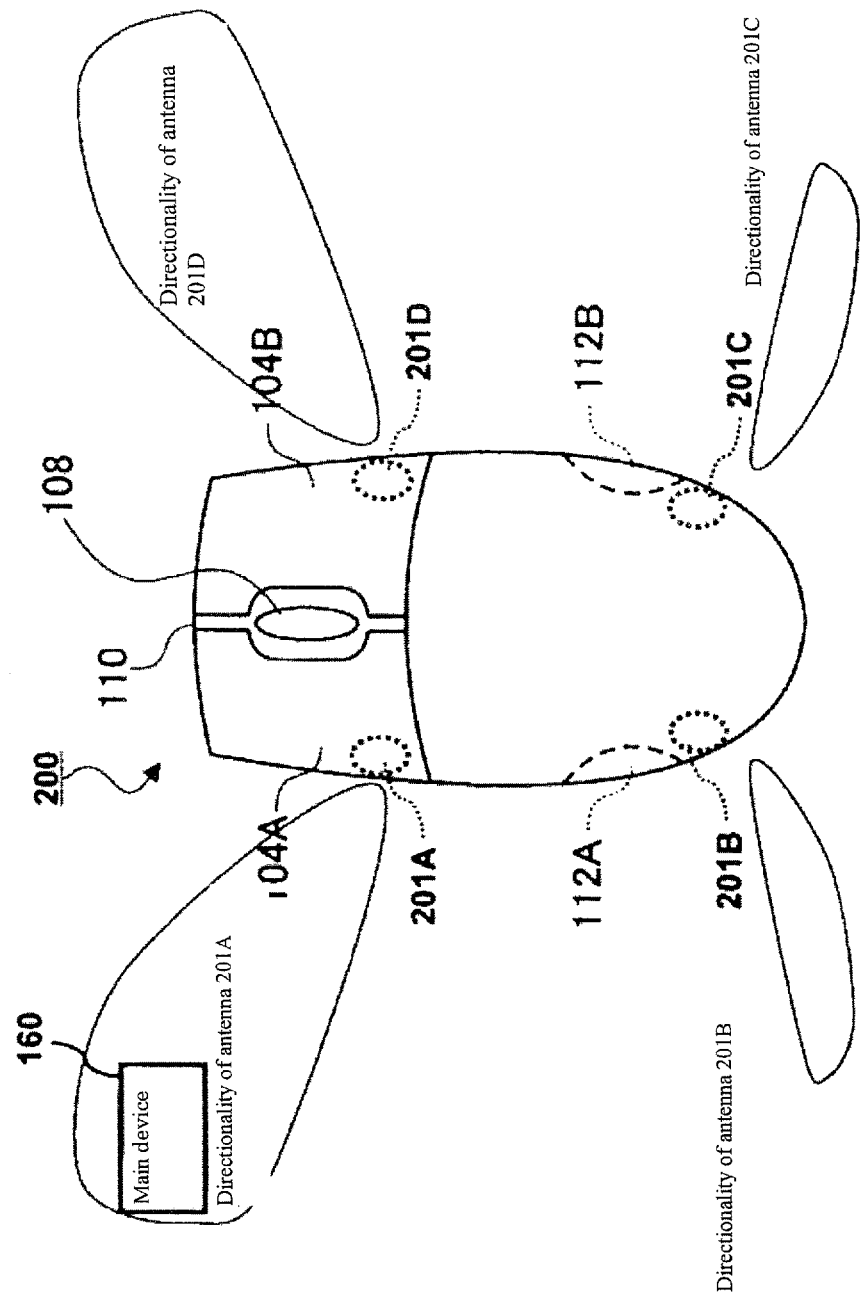
FIG. 8 is a plan view showing one example of the mouse according to the third embodiment of the present invention.

FIG. 8 is a plan view showing one example of the mouse according to the third embodiment. A mouse 200 has four directional antennas 201 in addition to the constitution of the mouse 100. When the directional antennas 201 are described with no distinction, they are simply referred to as the directional antenna 201, and when the directional antennas 201 are described with distinction, they are referred to as the directional antennas 201A-201D.

The directional antennas 201A-201D have directionality as shown in the figures, respectively. The mouse 200 communicates with the main device 160 via any of the directional antennas 201.

Figure 9:
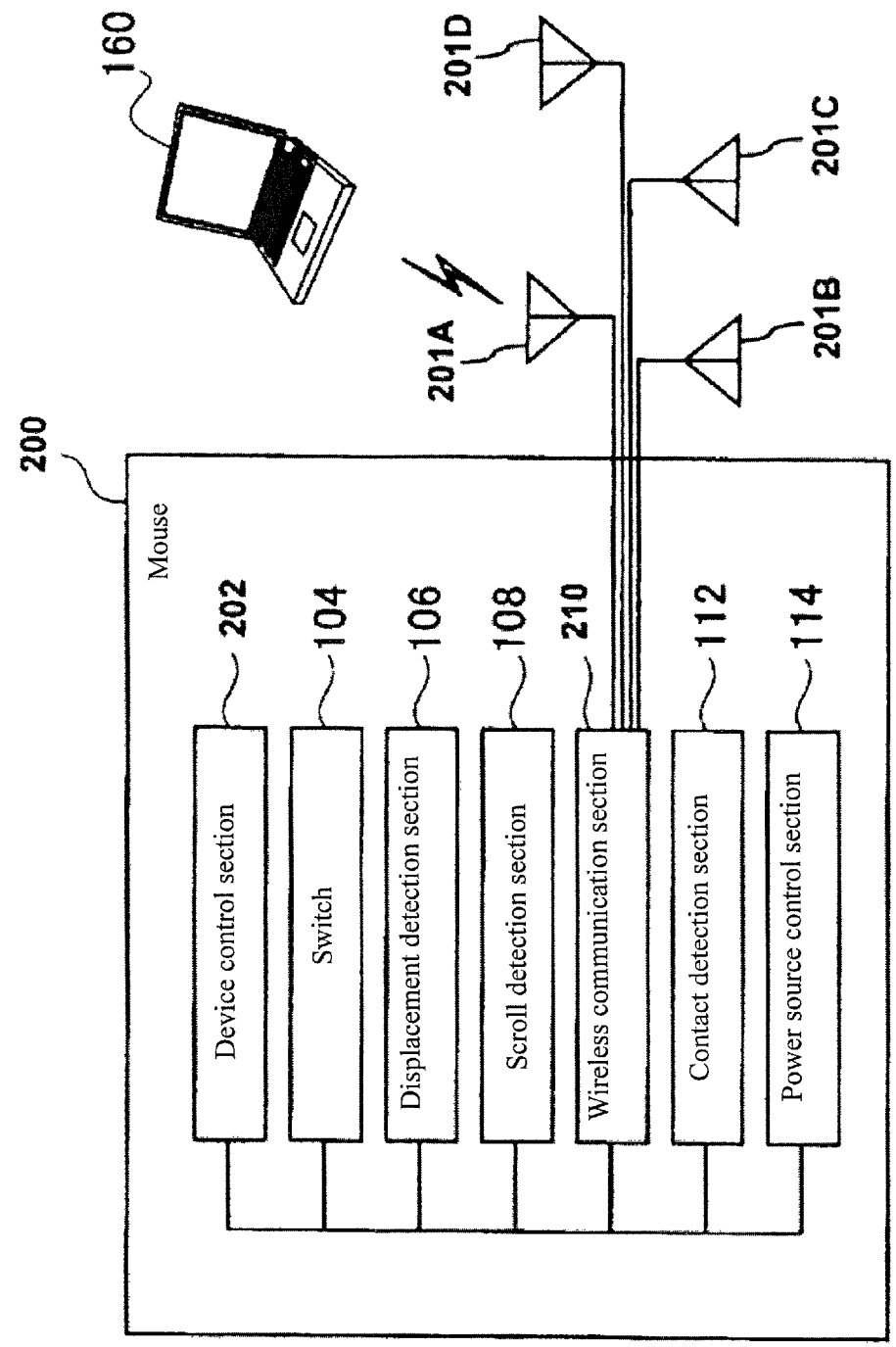
FIG. 9 is a block diagram showing components of the mouse according to the third embodiment of the present invention.

FIG. 9 is a block diagram showing components of the mouse 200 according to the third embodiment. The mouse 200 is a device control section 202, the plurality of switches 104 (104A, 104B), the displacement detection section 106, the scroll detection section 108, a wireless communication section 210, the plurality of contact detection sections 112 (112A, 112B), and the power source control section 114. With regard to the components that constitute the mouse 200, the same reference numbers as that of the mouse 100 according to the first embodiment are attached to the same components so as to omit their description.

The wireless communication section 210 is adapted to select any of directional antennas 201 and to transmit and receive signals via the selected directional antenna 201.

The device control section 202 causes the wireless communication section 210 to select the directional antenna 201A or the directional antenna 201B when the contact detection sections 112 detect that the dominant hand of the user is the right hand in accordance with the presence or the absence of a contact that is detected, and causes the wireless communication section 210 to select the directional antenna 201C or the directional antenna 201D when it detects that the dominant hand of the user is the left hand.

With regard to whether to use the upper side directional antennas (the directional antenna 201A, the directional antenna 201D) or the lower side directional antennas (the directional antenna 201B, the directional antenna 201C), the user can switch using an upper side-lower side switching section (an operation switch), which is not shown the figures. This upper side-lower side switching section is appropriately operated by the user based on an arrangement relationship between the main device 160 and the mouse 200. For, example, as shown in FIG. 8, when the main device 160 is placed in front of the mouse 200, the upper side-lower side switching section is operated by the user so as to use the upper side directional antennas. When the main device 160 is placed behind the mouse 200, the upper side-lower side switching section is operated by the user so as to use the lower side directional antennas.

Figure 10:
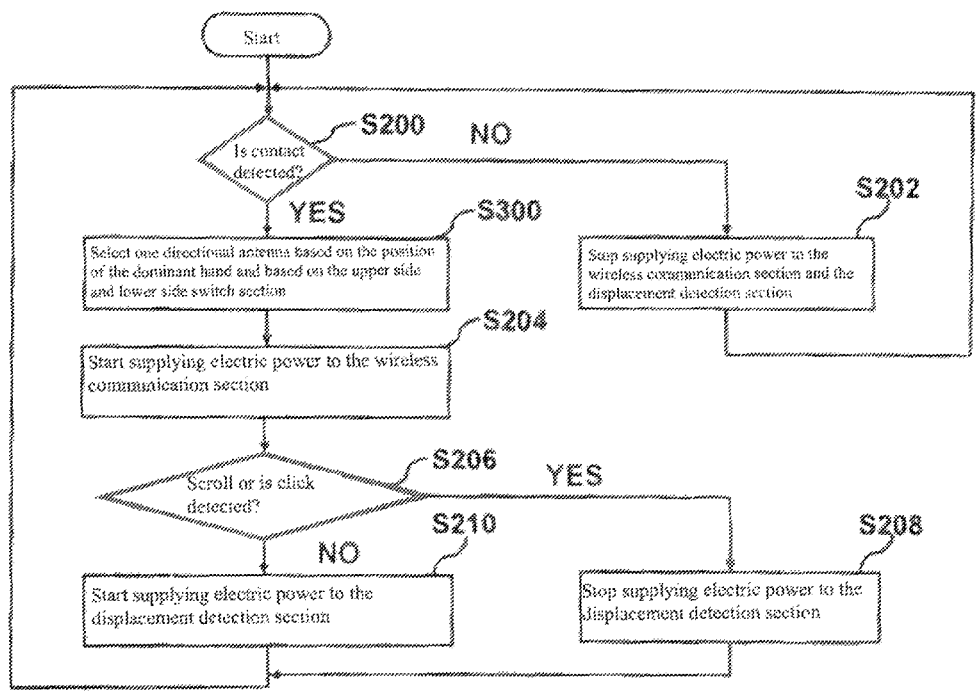
FIG. 10 is a flowchart describing the process flow of the electric power control method according to the third embodiment of the present invention.

FIG. 10 is a flowchart describing a flow of processes of the method for electric power control according to the third embodiment.

Under the condition in which the mouse 200 is utilized, whether or not the contact detection section 112 in the mouse 200 detects a contact of the user is determined (S200), and the device control section 202 causes the wireless communication section 210 to select one of the directional antennas 201 based on the detected a dominant hand and a positions of the upper side-lower side switching section (S300). Because the subsequent processes are the same as the processes of the method for electric power control according to the first embodiment, such descriptions are omitted. Subsequently, signals are transmitted and received via the selected directional antenna 201.

Additionally, when the directional antennas 201A-201D are implemented in the mobile phone 300 according to the second embodiment, it can perform the same processes as that of the mouse 200. That is, the mobile phone 300 comprises the directional antennas 201 on the left side and the right side of the mobile phone 300, and the terminal control section 302 causes the wireless communication section 110 to select the left side directional antennas 201 when the hand of the user is identified to be right and causes the wireless communication section 110 to select the right side directional antennas 201 when the hand of the user is identified to be left.

As described above, in the third embodiment, because the mouse 200 utilizes the directional antenna, a radio wave can be transmitted to the main device 160 with less electricity consumption as compared to the use of a nondirectional antenna. Additionally, because the mouse 200 utilizes a directional antenna, the attainable range of radio waves that are emitted from the antenna can be lengthened as compared to the use of a nondirectional antenna.

Although preferred embodiments of the present invention have been described above with reference to the attached drawings, the present invention is obviously not limited to such examples. It is apparent to those skilled in the art that various variations or modifications are considered within the scope described in claims and it is also understood that they obviously fall within the scope of claims.

For example, in the abovementioned second embodiment, although operation commands of the mobile phone 300 are created in accordance with the combinations of the contact detection sections 112 that are shown in the table in FIG. 7, it is not limited thereto, and the number of the contact detection sections 112 is not limited to the above-mentioned example, and various combinations of the operation commands that utilize any number of the contact detection sections 112 can be applied.

With regard to each of the abovementioned processes in the method for electric power control, it is not necessary to process them in chronological order along the order that is described in the flowchart; instead, they may include parallel or subroutine processes.

INDUSTRIAL APPLICABILITY

The present invention can be utilized in a pointing device and a wireless terminal which are, for example, connected to a personal computer, etc., via wireless signals.

The invention claimed is:
1. A pointing device comprising:
a displacement detection section that detects an amount of displacement and a direction of displacement of the pointing device;
a wireless communication section coupled to a first directional antenna, a second directional antenna, a third directional antenna and a fourth directional antenna, the wireless communication section operable to transmit information of the amount of displacement and the direction of displacement which are detected by the displacement detection section as a radio signal;
at least one contact detection section placed at a position to detect the presence or the absence of a contact of the right hand or the left hand of a user that grips the pointing device;
a power source control section that, while the at least one contact detection section detects any contact, supplies electric power to the wireless communication section and the displacement detection section, and that, while the at least one contact detection section does not detect any contact, does not supply electric power to the wireless communication section and the displacement detection section;
the first directional antenna and the third directional antenna located on a left side of the pointing device and separated by the at least one contact section located therebetween; and
the second directional antenna and the fourth directional antenna located on a right side of the pointing device and separated by the at least one contact section located therebetween; and
a device control section operable
to identify that the contact that is detected by the at least one contact detection section is either the left hand or the right hand, and
to cause the wireless communication section to select one of the first directional antenna or the third directional antenna when the hand is identified to be the right hand, and causes the wireless communication section to select one of the second directional antenna or the fourth directional antenna when the hand is identified to be the left hand.
2. The pointing device according to claim 1, further comprising:
a switch placed on the left side and the right side of the pointing device,
wherein the device control section exchanges left and right operation commands of the switches that are placed on the left side and the right side in accordance with the identification of either the left hand or the right hand detected by the at least one contact detection section; and
the wireless communication section transmits an operation command of the switch as a wireless signal.

3. The pointing device according to claim 2, wherein the power source control section, while the switch is being operated, does not supply electric power to the displacement detection section.

4. The pointing device according to claim 1, further comprising:
a scroll detection section that detects an amount of scroll and a direction of scroll; wherein the power source control section, while the scroll detection section detects the amount of scroll and the direction of scroll, does not supply electric power to the displacement detection section.

5. The pointing device according to claim 1, wherein the at least one contact detection section comprises a first contact detection section placed on the right side of the pointing device, and a second contact detection section placed on the left side of the pointing device.

6. The pointing device according to claim 5, wherein the first contact detection section is placed on a lower end of the right side of the pointing device and the second directional antenna is placed on an upper end of the right side of the pointing device; and
wherein the second contact detection section is placed on a lower end of the left side of the pointing device and the first directional antenna is placed on an upper end of the left side of the pointing device.

7. The pointing device according to claim 1, wherein a directionality of the first directional antenna is different than a directionality of the second directional antenna.

8. The pointing device according to claim 1, wherein the at least one contact detection section comprises a first contact detection section and a second contact detection section;
wherein the first contact detection section is placed on a lower end of the right side of the pointing device, the second directional antenna is placed on an upper end of the right side of the pointing device, and the fourth directional antenna is placed on the lower end of the right side of the pointing device; and
wherein the second contact detection section is placed on a lower end of the left side of the pointing device and the first directional antenna is placed on an upper end of the left side of the pointing device, and the third directional antenna is placed on the lower end of the left side of the pointing device.

9. The pointing device according to claim 1, wherein each of the first, second third and fourth directional antennas has a different directionality.

* * * * *